(12) United States Patent
Angus et al.

(10) Patent No.: US 8,813,974 B1
(45) Date of Patent: Aug. 26, 2014

(54) VIBRATING CENTRIFUGE

(75) Inventors: Robert Angus, Brisbane (AU); Anthony Elliott, Brisbane (AU)

(73) Assignee: Flsmidth A/S (DK)

( * ) Notice: Subject to any disclaimer, the term of this patent is extended or adjusted under 35 U.S.C. 154(b) by 0 days.

(21) Appl. No.: 14/128,000

(22) PCT Filed: Jun. 19, 2012

(86) PCT No.: PCT/AU2012/000705
§ 371 (c)(1),
(2), (4) Date: Apr. 1, 2014

(87) PCT Pub. No.: WO2012/174588
PCT Pub. Date: Dec. 27, 2012

(30) Foreign Application Priority Data

Jun. 23, 2012 (AU) .................................. 2011902462

(51) Int. Cl.
*B01D 33/00* (2006.01)
*B04B 3/06* (2006.01)
(52) U.S. Cl.
CPC .............. *B01D 33/0006* (2013.01); *B04B 3/06* (2013.01)
USPC ......... 210/376; 210/380.3; 210/384; 210/388
(58) Field of Classification Search
CPC .............................. B04B 3/06; B01D 33/0006
USPC ................................ 210/376, 380.3, 384, 388
See application file for complete search history.

(56) References Cited

U.S. PATENT DOCUMENTS

| 2,991,887 | A | | 7/1961 | Wirth et al. |
| 4,069,966 | A | | 1/1978 | Crosby et al. |
| 5,676,835 | A | * | 10/1997 | Derton et al. .............. 210/380.3 |
| 2007/0215560 | A1 | | 9/2007 | Whisler et al. |

FOREIGN PATENT DOCUMENTS

JP        2009262031 A      11/2009

OTHER PUBLICATIONS

The International Search Report dated Sep. 20, 2012, 4 pages.
The Written Opinion dated Sep. 20, 2012, 4 pages.

* cited by examiner

*Primary Examiner* — David A Reifsnyder
(74) *Attorney, Agent, or Firm* — Aaron M. Pile; Daniel DeJoseph; Jeffrey A. Sharp

(57) ABSTRACT

A vibrating centrifuge having a separation screen that is rotated and vibrated to separate a material, typically slurry (e.g. coal slurry). The separation screen is vibrated by a vibrator, such as an unbalanced motor. One or more constraint members, preferably leaf springs, are provided that restrict vibration generated by the vibrator to a single degree of freedom that is parallel to the drive shaft axis. The vibrating centrifuge has a biasing member in the form of a compression spring to tune the vibration frequency. Optionally a tuning mass can also be used to tune the vibration frequency.

18 Claims, 3 Drawing Sheets

VIBRATING CENTRIFUGE

FIELD OF THE INVENTION

The invention relates to a vibrating centrifuge. In particular, the invention relates, but is not limited, to a vibrating centrifuge having a vibrator, such as an unbalanced motor, that provides axial vibration to a basket through a spring system.

BACKGROUND TO THE INVENTION

Reference to background art herein is not to be construed as an admission that such art constitutes common general knowledge in Australia or elsewhere.

Centrifugal separators are often used for the separation of solids and liquids from slurry. For example, for separating coal solids from a coal slurry that includes water. Vibrating centrifuges typically have an axially vibrating rotational basket, which the slurry traverses, with the liquids being expelled outwards through the basket and the solids being carried down tapered sides of the basket to an outlet.

The vibrating centrifuges are typically tuned to operate at particular frequencies to improve efficiency. However, tuning the vibrating centrifuge can be difficult and costly. This is at least partially because tuned vibrating centrifuges generally require certain parts, such as springs, to be within a very high tolerance. Such high tolerance parts not only significantly increase manufacturing costs, but are prone to error and can be difficult to source. Furthermore, rotating and vibrating the basket uses a considerable amount of energy which is often wasted through inefficient damping and energy transfer.

OBJECT OF THE INVENTION

It is an aim of this invention to provide a vibrating centrifuge which overcomes or ameliorates one or more of the disadvantages or problems described above, or which at least provides a useful alternative.

Other preferred objects of the present invention will become apparent from the following description.

SUMMARY OF INVENTION

According to a first aspect of the invention, there is provided a vibrating centrifuge comprising:

a separation screen that is connected to a drive shaft;

at least one vibrator that generates vibration in the separation screen;

one or more constraint members that substantially restrict vibration generated by the vibrator to a single degree of freedom that is parallel to the drive shaft axis; and at least one biasing member engaged with the vibrator to tune the vibration frequency.

Preferably the vibrating centrifuge further comprises a separation housing. The separation housing preferably contains at least the separation screen. A sprung mass portion is preferably provided that includes a bearing housing, a drive shaft and the separation screen. A rubber seal may be provided between the separation housing and the bearing housing. The drive shaft preferably passes from the separation screen inside the separation housing, through the bearing housing, to a drive portion. The drive portion is preferably a drive pulley engagement portion.

The vibrating centrifuge preferably further comprises a base. The separation housing and drive motors are preferably mounted on the base. The base preferably has ground engagement portions that comprise isolation springs. Preferably the ground engagement portions are feet and preferably the isolation springs comprise an elastomeric material.

Preferably the vibrator is a vibratory motor, such as an unbalanced motor. Alternatively, the vibrator may be a dedicated vibrating unit or a vibrator with an integral mechanism, preferably one which generates only axial vibration. The dedicated vibrating unit may have two rotating forces that cancel each other to provide an axial force.

Preferably the vibrator is mounted on a frame which is mounted on the base. Preferably there are two vibrators comprising two counter rotating unbalanced motors to provide a linear drive force. Preferably a first unbalanced motor is located on a first side of the bearing housing and a second unbalanced motor is located in a second side of the bearing housing.

The biasing member is preferably a compression spring. Preferably one or more compression springs are provided on each side of the bearing housing between the bearing housing and the base, and preferably they are located to bias in an axis parallel to the drive shaft axis. Preferably the compression spring comprises an elastomeric material.

The one or more constraint members preferably comprise leaf springs. The leaf springs preferably flex in only one axis parallel to the drive shaft axis. Preferably two leaf springs are provided, one on each side of the bearing housing aligned in an axis parallel to the drive shaft axis. A first end of each leaf spring is preferably mounted to the bearing housing and a second end of each leaf spring is preferably mounted to the base.

Preferably the separation screen is a basket. Even more preferably the basket is a frustoconical basket that rotates axially in use. An inlet is preferably provided to convey material to be separated, such as slurry, to the inside of the basket. Preferably the inlet is a chute.

The at least one biasing member and/or a tuning mass may be utilised to tune the frequency of vibration of the centrifuge. Preferably the frequency of vibration of the centrifuge is initially tuned by design. The tuning mass may be utilised to retune frequency of vibration of the centrifuge, if necessary.

The tuning mass is preferably a solid mass mounted onto a portion of the vibrating centrifuge. Preferably the tuning mass is mounted onto the bearing housing. The tuning mass may be bolted onto the bearing housing. Preferably the tuning mass is located centrally relative to the drive shaft axis. The tuning mass may comprise a plurality of mass members selected to provide an overall required tuning mass.

Preferably the vibrating centrifuge is configured as a two degree of freedom dynamic absorber system. Even more preferably the vibrating centrifuge is configured as a tuned dynamic absorber with and the tuning mass being selected to at least assist with tuning the dynamic absorber.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
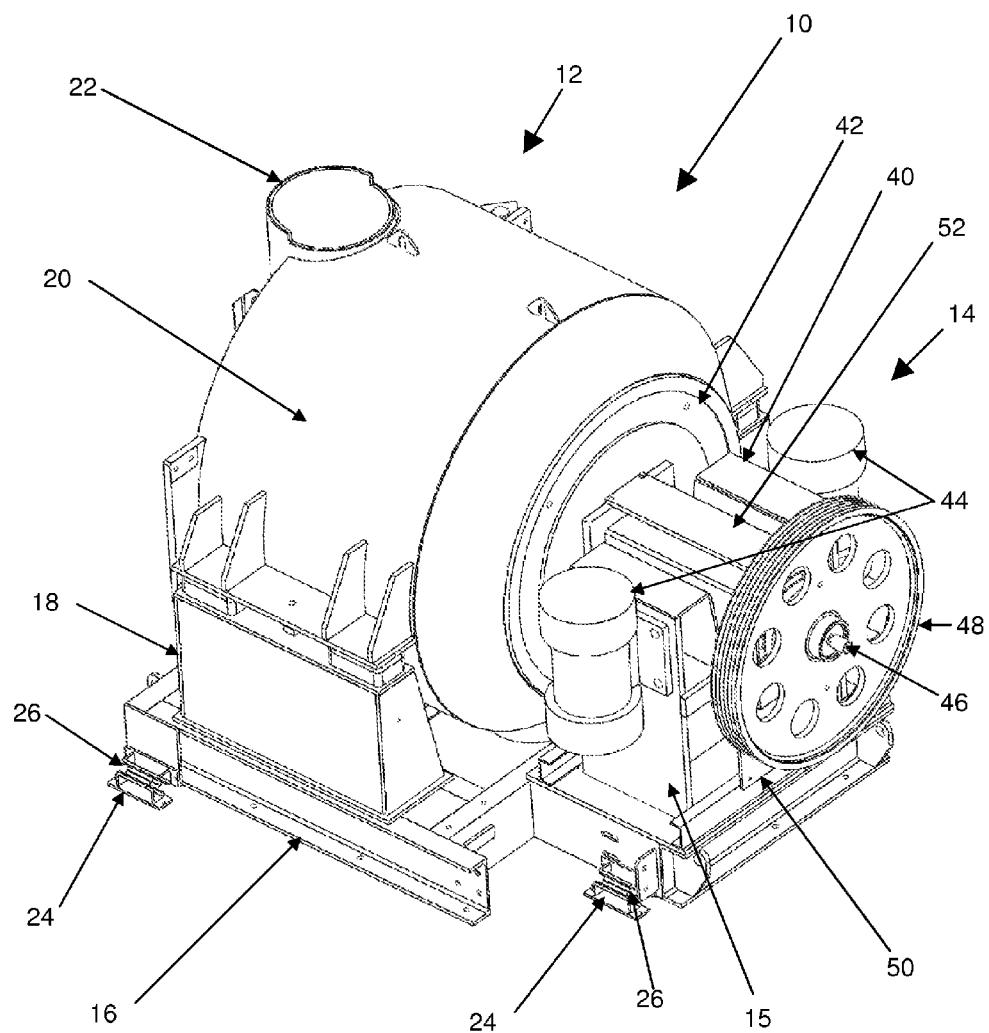
FIG. 1 is a perspective view of a vibrating centrifuge according to an embodiment of the invention.
Figure 2:
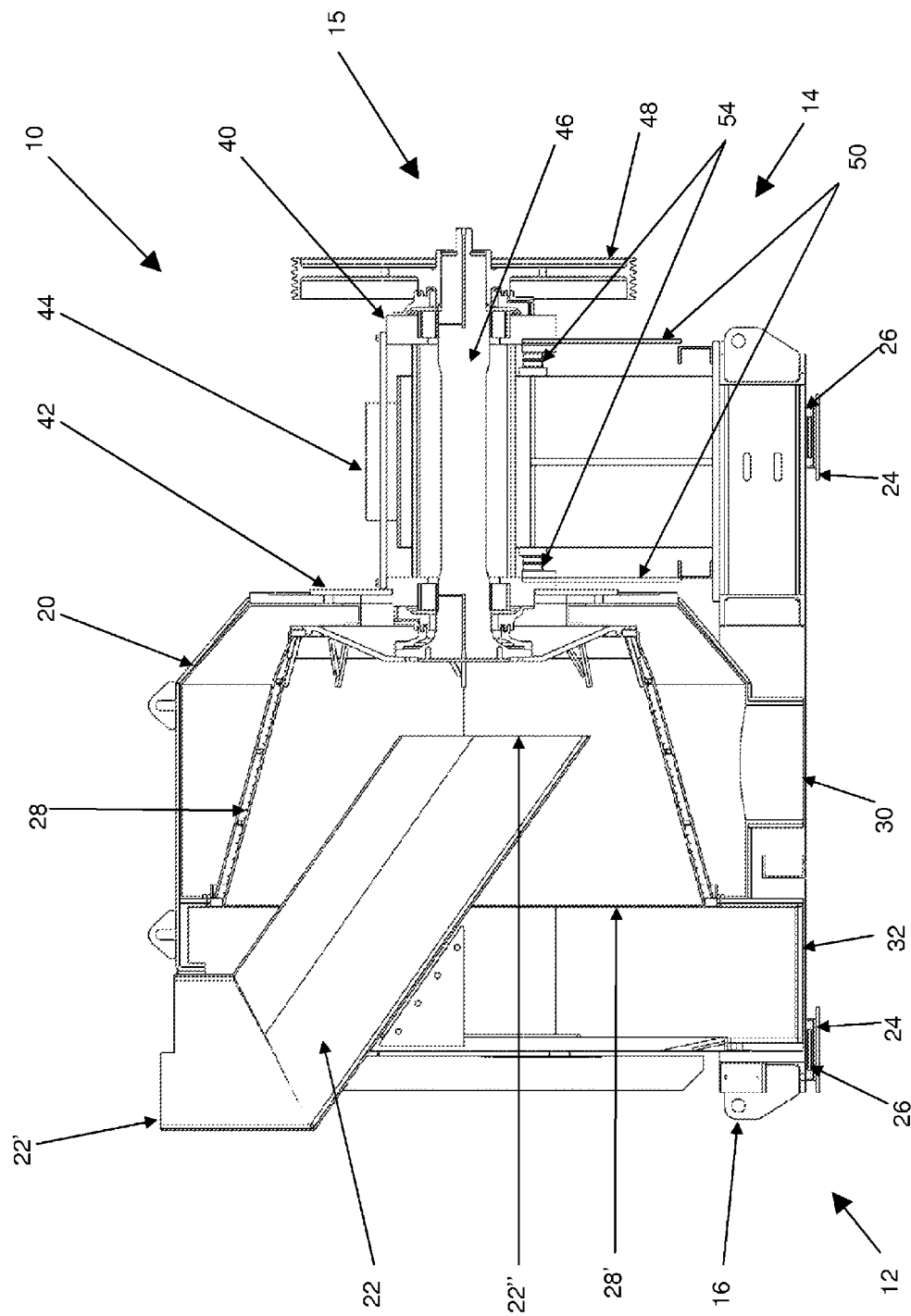
FIG. 2 is a side cross sectional view of the vibrating centrifuge illustrated in FIG. 1.
Figure 3:
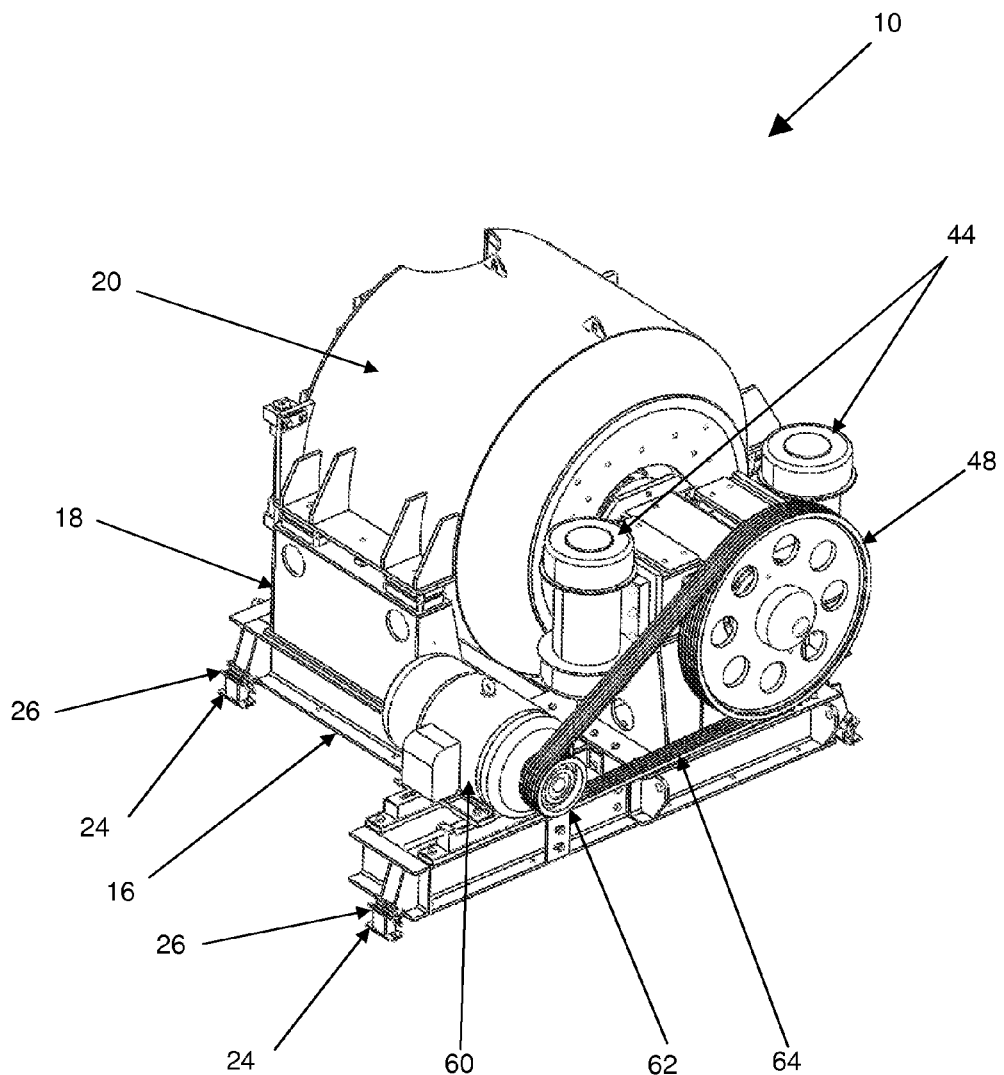
FIG. 3 is a perspective view of a vibrating centrifuge showing the drive motor.

FIGS. 1, 2, and 3 illustrate a vibrating centrifuge 10 having a separation portion 12, a drive portion 14, and a sprung mass portion 15. The separation portion 12 has a separation housing 20 rigidly mounted to a base 16 by stiffeners 18. The separation housing 20 has an inlet in the form of a chute 22 which material to be separated, such as slurry, is conveyed to inside the separation housing 20, as will be discussed herein. The base 16 has ground engagement portions in the form of feet 24 which are connected to the base 16 via isolation springs 26.

The drive portion 14 has vibrators in the form of unbalanced motors 44 which are mounted on a support frame 45 which is rigidly connected to the base 16. The unbalanced motors are configured such that in use they rotate in opposite directions (i.e. counter rotating).

The sprung mass portion 15 has a number of components which move together in use. These components include a bearing housing 40, a drive shaft 46, a drive pulley 48, a basket 28, and other components such as bearings and bearing covers. The drive shaft 46 is engaged with the bearing housing 40 via bearings. The drive shaft 46 is provided with a drive portion in the form of a drive pulley 48 on an end thereof. Constraint members in the form of leaf springs 50 are provided on either side of the bearing housing 40 (most clearly seen in FIG. 2) in a manner which allows movement of the sprung mass portion 15 in an axis parallel to the drive shaft 46 axis but limits movement in other axes. Effectively, the leaf springs 50 limit the movement of the sprung mass portion 15 to one degree of freedom relative to the base 16 and, as a result, vibration energy from the unbalanced motors 44 is translated into a single axis, namely the axis parallel to the drive shaft 46 axis.

A tuning mass 52 may be bolted onto the top of the bearing housing 40. It will be appreciated that the tuning mass 52 may have a mass selected to provide a specific predetermined mass and/or the tuning mass 52 may not be even be required. In a preferred embodiment the vibrating centrifuge 10 is tuned by design without any tuning mass 52. A tuning mass 52 may be added later to retune the frequency of vibration, if required.

A rubber seal 42 is provided between the separation housing 20 and the bearing housing 40 to prevent any material being separated inside the separation housing 20 leaking outside the vibrating centrifuge 10.

Turning specifically to FIG. 2, which illustrates the internal components, particularly of the separation housing 20, it can be seen that the separation portion 12 has a separation screen in the form of a basket 28. The basket 28 is engaged with, and rotates with, the drive shaft 46. The chute 22 has an inlet end 22' and an outlet end 22" which conveys the material to be separated from a source (not shown) to inside the basket 28. The separation housing 20 has a first outlet 30 which is allows material separated by the centrifuge 10, namely material that passes through apertures in the basket 28, to be removed from the centrifuge 10. A second outlet 32 allows material that does not pass through the apertures in the basket 28 to also be removed from the centrifuge 10.

Two or more biasing members in the form of compression springs 54 are provided on either side of the bearing housing 40, between the bearing housing and the support frame 45. The compression springs 54 are arranged to allow compression in an axis parallel to the drive shaft 46 axis. In a preferred embodiment the compression springs 54 are elastomeric members which are selected for a predetermined dynamic absorber frequency of vibration.

The masses of the system coupled with the compression springs 54 and isolation springs 26 provide a two degree of freedom dynamic absorber system. In particular, the mass of the sprung mass portion 15, including the adjustable tuning mass 52, is effectively an absorber mass and the mass of the components rigidly connected to the base 16, including the separation housing 20, is effectively a secondary mass of a dynamic absorber system. The springs and masses, most notably the mass of the sprung mass portion 15 which includes the changeable tuning mass 52, can be altered to change the dynamic absorber characteristics as desired, preferably to maintain a tuned dynamic absorber system.

In use, the drive pulley 48 is driven by an external power source in the form of a drive motor 60 mounted on the base 16 (see FIG. 3). The drive motor 60 has a drive wheel 62 which engages with a belt 64. The belt 64 also engages with the drive pulley 48 such that rotation of the drive wheel 62 rotates the drive pulley 48, which in turn rotates the shaft 46 and consequently the basket 28.

The unbalanced motors 44 rotate providing dynamic force to the secondary mass which is reacted by the sprung mass portion 15 causing it to vibrate. Because the bearing housing 40 is constrained to one degree of freedom, relative to the base, by the leaf springs 50, the sprung mass portion 15 vibrates back and forth along the drive shaft axis. The system is tuned by design, but may be tuned or retuned by adding or adjusting the tuning mass 52, such that maximum vibration energy is transferred from the unbalanced motors 44 to the basket 28.

A material to be separated, such as slurry being a combination of solids and liquids, is fed into the inlet end 22' of the chute 22 where it is conveyed to the outlet end 22" inside the basket 28. The material to be separated then hits the sides of the basket 28, which has apertures, and is rotated which applies centrifugal force to the material. The liquid component of the slurry passes through the basket while the solid component cannot.

The liquids, which are usually undesirable, are drained down first outlet 30 for further processing and/or disposal. The solid component which cannot pass through the basket 28 traverses the inclined walls of the basket 28 under centrifugal force. The axial vibration provided by the drive portion 14 assists in movement of the solids along basket 28 and prevents, or at least minimises, build up of solid material on the inner surface of the basket 28. When the material reaches the outermost edge 28' it primarily comprises the solid component of the material as the liquid component has been removed. The solids may then be transferred for further processing, or the like via the second outlet 32.

Advantageously, the present invention results in a vibrating centrifuge 10 that provide sufficient vibration to the basket 28 while utilising smaller vibration motors 44 and less energy than a conventional vibrating centrifuge due to improved energy transfer of the vibration energy. Furthermore, the operating frequency of each vibrating centrifuge 10 can be easily tuned by changing the mass of the tuning mass 44. This allows lower tolerance parts to be used, particularly for the springs, which results in reduced manufacturing and maintenance costs.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A vibrating centrifuge comprising:
    a separation screen that is connected to a drive shaft;
    at least one vibrator that generates vibration in the separation screen;
    one or more constraint members that substantially restrict vibration generated by the vibrator to a single degree of freedom that is parallel to the drive shaft axis; and
    at least one biasing member engaged with the vibrator to tune the vibration frequency.

2. The vibrating centrifuge of claim 1, further comprising a base having ground engagement portions that comprise isolation springs, wherein the separation screen, at least one vibrator, one or more constraint members, and at least one biasing member are all mounted on the base.

3. The vibrating centrifuge of claim 2, wherein the isolation springs comprise an elastomeric material.

4. The vibrating centrifuge of claim 1, wherein the vibrator comprises a vibratory motor.

5. The vibrating centrifuge of claim 4, wherein there are two vibratory motors comprising two counter rotating unbalanced motors.

6. The vibrating centrifuge of claim 1, wherein the biasing member comprises a compression spring.

7. The vibrating centrifuge of claim 6, wherein the compression spring is biased in an axis parallel to the drift shaft axis.

8. The vibrating centrifuge of claim 6, wherein the compression spring comprises an elastomeric material.

9. The vibrating centrifuge of claim 1, wherein the constraint member is a leaf spring.

10. The vibrating centrifuge of claim 9, wherein the leaf spring is arranged to flex in only one axis parallel to the drive shaft axis.

11. The vibrating centrifuge of claim 1, further comprising a tuning mass.

12. The vibrating centrifuge of claim 11, wherein the tuning mass is located centrally relative to the drive shaft axis.

13. The vibrating centrifuge of claim 1, wherein the separation screen is a frustoconical basket that rotates axially about the drive shaft.

14. The vibrating centrifuge of claim 1, wherein the vibrating centrifuge is configured as a two degree of freedom dynamic absorber system.

15. The vibrating centrifuge of claim 14, wherein a mass of the dynamic absorber system includes a bearing housing, the drive shaft, and the separation screen.

16. The vibrating centrifuge of claim 14, wherein the vibrating centrifuge is configured as a tuned dynamic absorber.

17. The vibrating centrifuge of claim 1, further comprising a separation housing that contains the separation screen.

18. The vibrating centrifuge of claim 17, further comprising a rubber seal between the separation housing and a bearing housing.

\* \* \* \* \*